US010773559B2

United States Patent
Gobinath et al.

(10) Patent No.: US 10,773,559 B2
(45) Date of Patent: Sep. 15, 2020

(54) AIR MAINTENANCE TIRE

(71) Applicant: The Goodyear Tire & Rubber Company, Akron, OH (US)

(72) Inventors: Thulasiram Gobinath, Hudson, OH (US); Jin-Shy Steve Gau, Hudson, OH (US); Cheng-Hsiung Lin, Hudson, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 84 days.

(21) Appl. No.: 15/713,959

(22) Filed: Sep. 25, 2017

(65) Prior Publication Data

US 2018/0126799 A1 May 10, 2018

Related U.S. Application Data

(60) Provisional application No. 62/418,829, filed on Nov. 8, 2016.

(51) Int. Cl.
*B60C 23/12* (2006.01)
*B60C 23/10* (2006.01)

(52) U.S. Cl.
CPC ............... *B60C 23/12* (2013.01); *B60C 23/10* (2013.01)

(58) Field of Classification Search
CPC .......... B60C 13/02; B60C 23/12; B60C 23/10
USPC ........................................ 152/416, 417, 419
See application file for complete search history.

(56) References Cited

U.S. PATENT DOCUMENTS

| 7,225,845 | B2* | 6/2007 | Ellmann ................. B60C 23/12 |
| | | | 152/419 |
| 8,235,081 | B2 | 8/2012 | Delgado et al. |
| 8,322,036 | B2 | 12/2012 | Delgado et al. |
| 8,381,784 | B2* | 2/2013 | Delgado ................. B60C 23/12 |
| | | | 152/415 |
| 8,381,785 | B2 | 2/2013 | Losey |
| 8,695,661 | B2* | 4/2014 | Delgado ................. B60C 23/12 |
| | | | 152/415 |
| 8,851,132 | B2 | 10/2014 | Delgado et al. |
| 9,259,975 | B2 | 2/2016 | Welter et al. |
| 10,239,368 | B2 | 3/2019 | Benedict et al. |

(Continued)

FOREIGN PATENT DOCUMENTS

| EP | 2546083 | A1 | 1/2013 | |
| EP | 3031633 | | 6/2016 | |
| EP | 3031633 | A1 * | 6/2016 | ........... B60C 23/001 |

OTHER PUBLICATIONS

EPO search report dated Feb. 23, 2018 and received by Applicant on Mar. 5, 2018.
Chinese search report received by applicant Jul. 24, 2019.

*Primary Examiner* — Jason R Bellinger
(74) *Attorney, Agent, or Firm* — Edward T. Kennedy

(57) ABSTRACT

An air maintenance tire system is provided. The tire includes a pair of sidewalls, in which each one of the sidewalls extends from a respective bead area to a crown of the tire. The air maintenance tire includes an annular groove formed in a selected one of the tire sidewalls. The groove is formed with an open end at an outer surface of the tire sidewall and a closed end opposite the open end. The open end is formed with an outward radial taper and the groove is formed with at least one increased diameter feature. An air tube of a peristaltic pump assembly is received in the groove.

12 Claims, 9 Drawing Sheets

(56) References Cited

U.S. PATENT DOCUMENTS

2015/0375575 A1* 12/2015 Benedict ................ B60C 23/12
152/450
2016/0052350 A1 2/2016 Lamgaday
2016/0375731 A1 12/2016 Gobinath et al.
2017/0120699 A1 5/2017 Gobinath et al.

* cited by examiner

AIR MAINTENANCE TIRE

FIELD OF THE INVENTION

The invention relates to pneumatic tires and air maintenance tire systems, which are systems that maintain appropriate air pressure within the tire. More specifically, the invention is directed to a tire that includes a groove formed with structural features that improve the operation of a valve stem-based air maintenance tire system.

BACKGROUND OF THE INVENTION

Conventional pneumatic tires are designed to perform for relatively long periods of time. In many cases, automobile tires are now expected to have a useful service life of 30,000, 50,000 or 70,000 miles. However, even long-life pneumatic tires are subject to air pressure losses due to puncture by nails and other sharp objects, temperature changes, and/or diffusion of air through the tire itself.

Since air diffusion reduces tire pressure over time, the pneumatic tires may repeatedly become underinflated. Accordingly, drivers must in turn repeatedly act to maintain recommended air pressures in the vehicle tires to avoid reduced fuel economy, tire life, and/or vehicle braking and handling performance. Tire pressure monitoring systems (TPMS) are automated systems that have been proposed to warn drivers when the air pressure in the vehicle tires is significantly low. Such systems, however, remain dependent upon a driver taking remedial action, when warned, to re-inflate a tire to the recommended pressure. It had thus been desirable in the prior art to incorporate an air maintenance feature within a pneumatic tire that would maintain a predetermined or recommended air pressure without requiring driver intervention.

To this end, air maintenance tire (AMT) systems have been developed. An AMT system typically includes one or more pumps or pumping assemblies that act to increase the air pressure in the vehicle tires as needed. An example of one such system is a valve stem-based air maintenance tire system described in U.S. Pat. No. 8,381,784, which is owned by the same Assignee as the present invention, that is, The Goodyear Tire & Rubber Company.

In such AMT systems, and particularly valve stem-based AMT systems, an annular air tube is disposed in a groove formed in a sidewall of the tire and is sequentially flattened or squeezed by the tire footprint as the tire rotates, which directs air to a valve housing. The valve housing is disposed within a wheel rim and is fluidly connected to a tire valve stem, which in turn is in fluid communication with the tire cavity. To enable the fluid communication of air from the annular air tube to the valve housing, one or more connecting tubes extend between the annular air tube and the valve housing.

In order to optimize the operation of such a valve stem-based AMT system, it is desirable to optimize the pumping ability of the annular air tube. Therefore, it is desirable to provide a tire formed with features that enable such optimization of the pumping ability of the air tube.

SUMMARY OF THE INVENTION

According to an aspect of an exemplary embodiment of the invention, an air maintenance tire is provided. The air maintenance tire includes a pair of sidewalls, in which each one of the sidewalls extends from a respective bead area to a crown of the tire. An annular groove is formed in a selected one of the tire sidewalls. The groove is formed with an open end at an outer surface of the tire sidewall and a closed end opposite the open end. The open end of the groove is formed with an outward radial taper. An air tube of a peristaltic pump assembly is received in the groove.

According to aspect of another exemplary embodiment of the invention, an air maintenance tire is provided. The air maintenance tire includes a pair of sidewalls, in which each one of the sidewalls extends from a respective bead area to a crown of the tire. An annular groove is formed in a selected one of the tire sidewalls. The groove is formed with an open end at an outer surface of the tire sidewall and a closed end opposite the open end. The groove is formed with at least one increased diameter feature. An air tube of a peristaltic pump assembly is received in the groove.

DEFINITIONS

"Axial" and "axially" means lines or directions that are parallel to the axis of rotation of the tire.

"Chafer" is a narrow strip of material placed around the outside of a tire bead to protect the cord plies from wearing and cutting against the rim and distribute the flexing above the rim.

"Circumferential" means lines or directions extending along the perimeter of the surface of the annular tread perpendicular to the axial direction.

"Equatorial Centerplane (CP)" means the plane perpendicular to the tire's axis of rotation and passing through the center of the tread.

"Footprint" means the contact patch or area of contact of the tire tread with a flat surface at zero speed and under normal load and pressure.

"Groove" means an elongated void area in a tire dimensioned and configured in section for receipt of an air tube therein.

"Inboard side" means the side of the tire nearest the vehicle when the tire is mounted on a wheel and the wheel is mounted on the vehicle.

"Lateral" means an axial direction.

"Lateral edges" means a line tangent to the axially outermost tread contact patch or footprint as measured under normal load and tire inflation, the lines being parallel to the equatorial centerplane.

"Outboard side" means the side of the tire farthest away from the vehicle when the tire is mounted on a wheel and the wheel is mounted on the vehicle.

"Peristaltic" means operating by means of wave-like contractions that propel contained matter, such as air, along tubular pathways.

"Radial" and "radially" means directions radially toward or away from the axis of rotation of the tire.

"Rib" means a circumferentially extending strip of rubber on the tread which is defined by at least one circumferential groove and either a second such groove or a lateral edge, the strip being laterally undivided by full-depth grooves.

BRIEF DESCRIPTION OF THE DRAWINGS

The invention will be described by way of example and with reference to the accompanying drawings, in which.

Similar numerals refer to similar parts throughout the drawings.

DETAILED DESCRIPTION OF THE INVENTION

Figure 1:
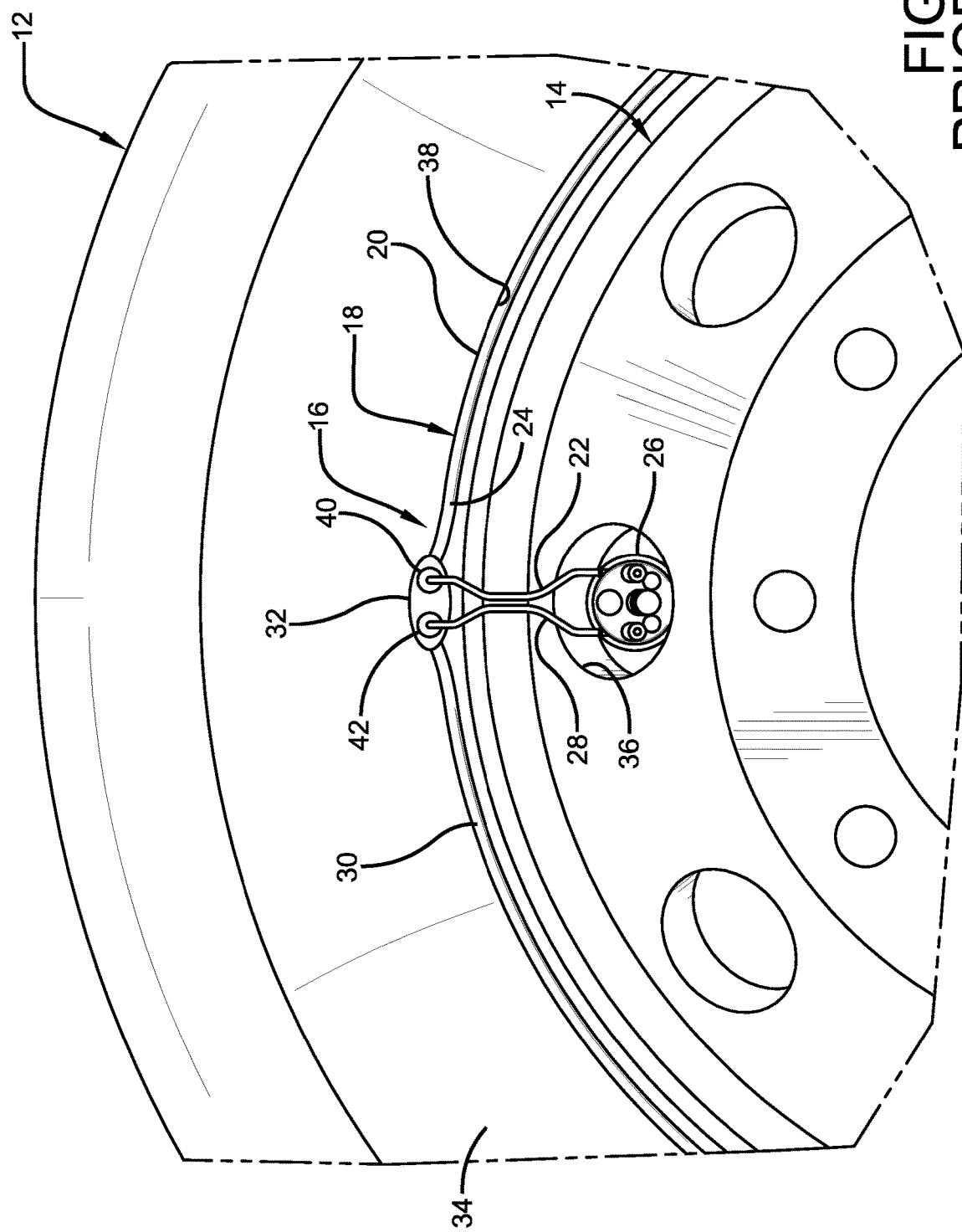
FIG. 1 is a fragmentary elevational view of a side of an air maintenance tire including components of a valve stem-based AMT system.
Figure 2:
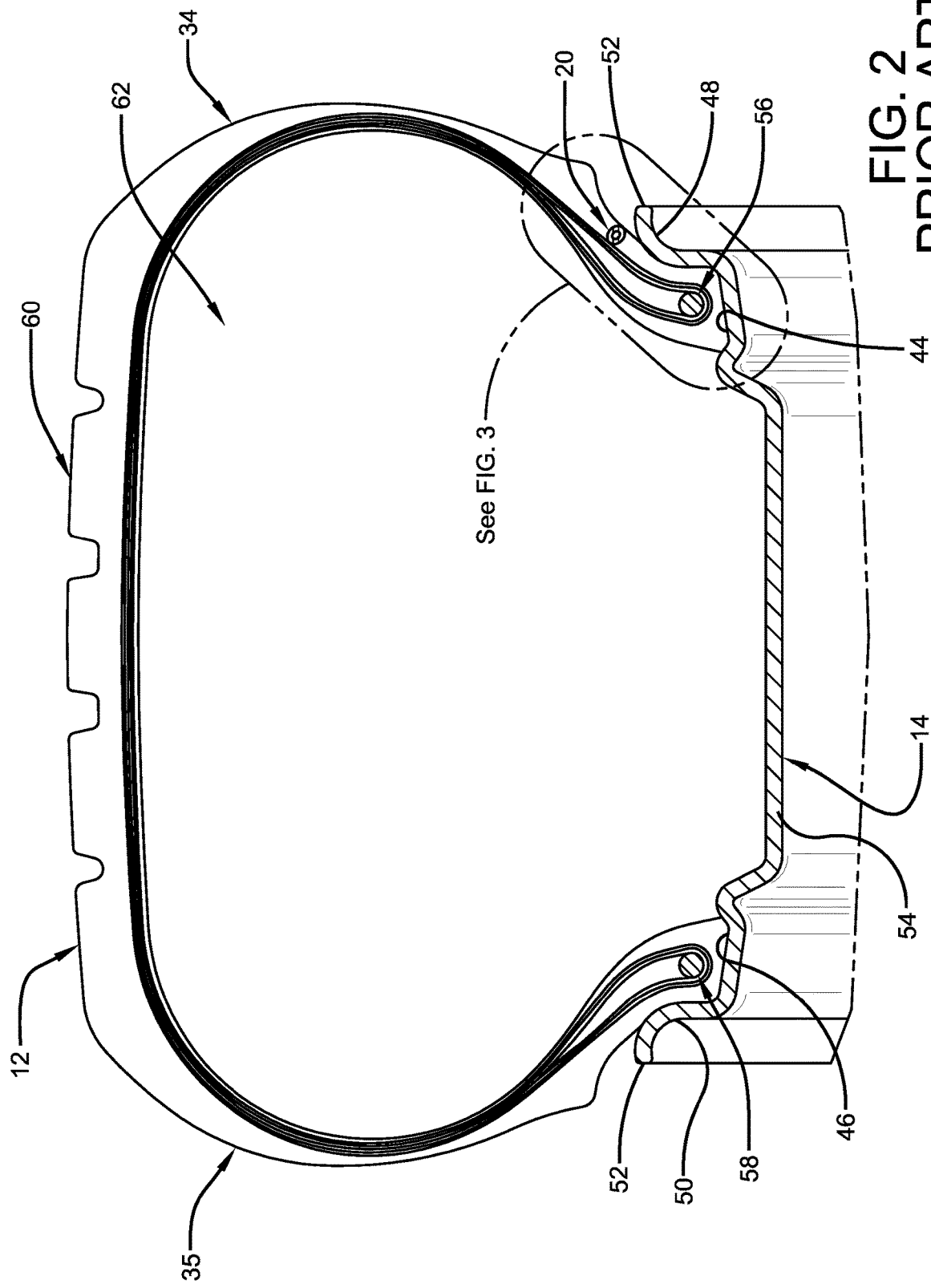
FIG. 2 is a cross-sectional view of an air maintenance tire of the prior art, including a prior art annular air tube of an AMT system in a non-compressed state.
Figure 4:
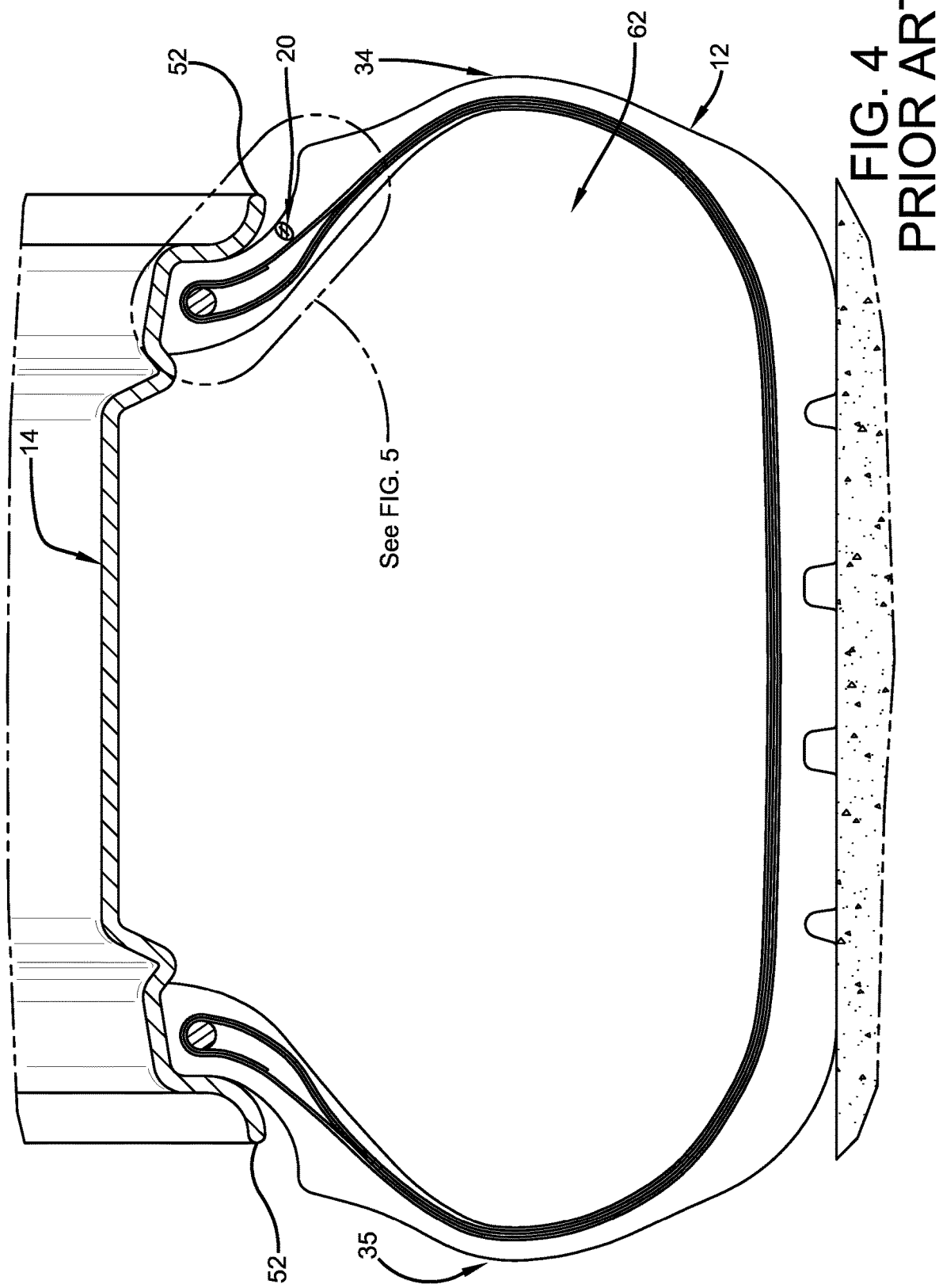
FIG. 4 is a cross-sectional view of the air maintenance tire shown in FIG. 2, with the annular air tube in a compressed state.

Turning first to FIGS. 1, 2 and 4, a tire 12 is mounted on a rim 14 in a conventional manner to a pair of rim mounting surfaces 44, 46 adjacent respective outer rim flanges 48, 50. The rim flanges 48, 50 each have a radially outward facing flange end 52 and a rim body 54 supports the rim flanges and the tire 12. The tire 12 is of generally conventional construction, including a pair of sidewalls 34, 35 extending from respective bead areas 56, 58 to a crown or tire tread region 60. The tire 12 and rim 14 enclose a tire cavity 62.

An exemplary air maintenance tire (AMT) system, such as a valve stem-based air maintenance tire system, is indicated at 16 in FIG. 1. The AMT system 16 includes a peristaltic pump assembly 18. With additional reference to FIGS. 2 and 3, the peristaltic pump assembly 18 includes an annular air tube 20 that is received in an annular groove 38 formed in a selected one of the tire sidewalls 34, and in turn encloses an annular passageway 64.

As shown in FIG. 1, a first connecting tube 22 attaches to a first end 24 of the air tube 20 and fluidly connects the first end of the air tube to a valve housing 26 of the pump assembly 18. A second connecting tube 28 attaches to a second end 30 of the air tube 20 and fluidly connects the second end of the air tube to the valve housing 26. While the AMT system 16 preferably includes two connecting tubes 22 and 28, one connecting tube or more than two connecting tubes may be employed, depending on specific design considerations.

Figure 5:
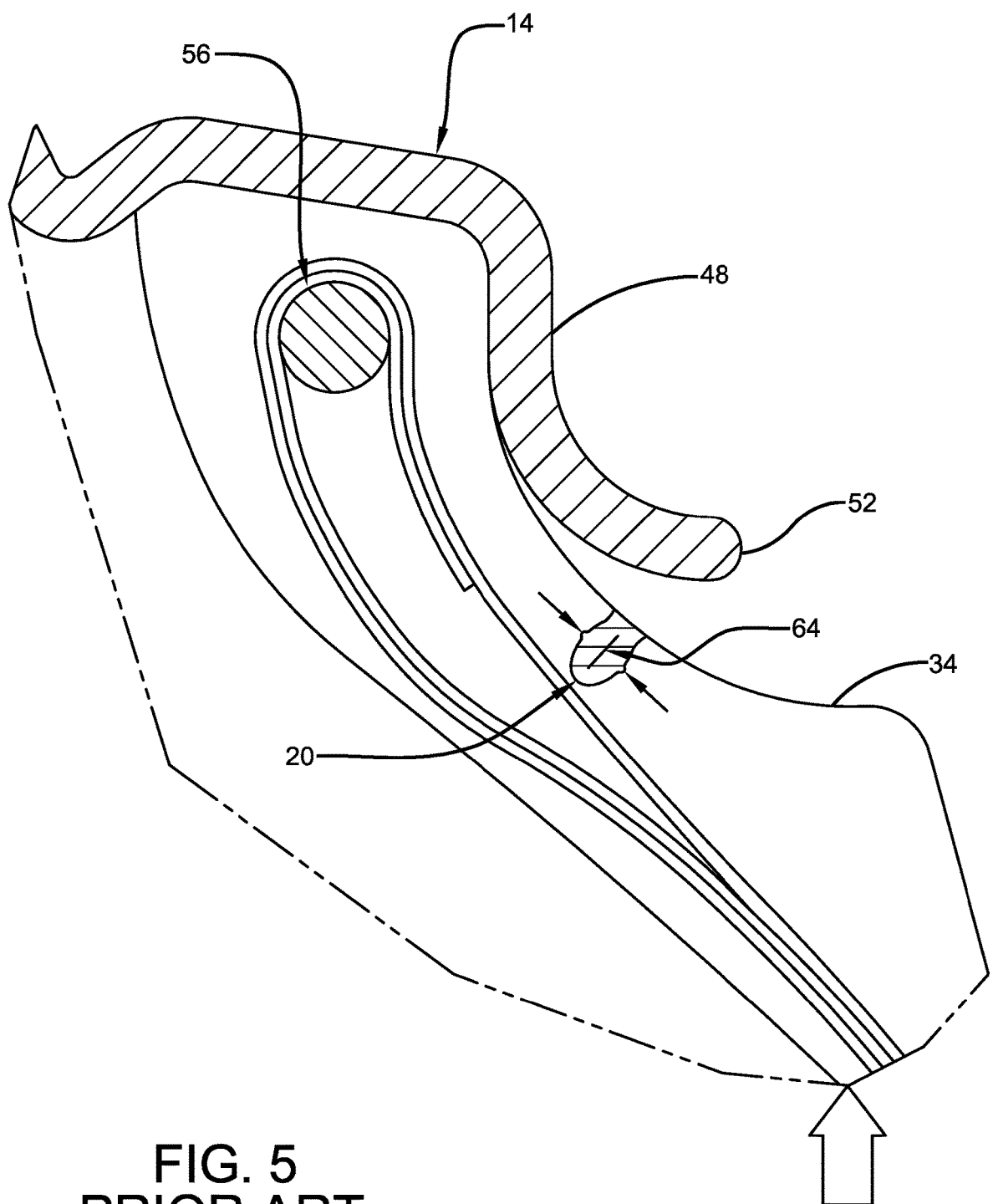
FIG. 5 is an enlarged view of the area from FIG. 4 designated as See FIG. 5.

When the tire 12 rotates under load along a ground surface, the air tube 20 is sequentially flattened or squeezed at the tire footprint, as shown in FIGS. 4 and 5. The sequential flattening of the air tube 20 and its passageway 64, segment by segment, directs air to the valve housing 26 (FIG. 1). A tire valve stem (not shown), preferably including a check valve, is fluidly connected to the valve housing 26 and is in fluid communication with the tire cavity 62. When the air pressure is sufficient against the check valve and the air pressure within the tire cavity 62 is below a set pressure level, air passes into the tire cavity. When the air pressure level within the tire cavity 62 is at or above the set pressure, the check valve closes and air from the pump assembly 18 is vented by a relief valve in the valve housing 26 to atmosphere.

As shown in FIG. 1, the valve housing 26 of the pump assembly 18 is disposed in a wheel disk. The connecting tubes 22, 28 pass through an opening 36 disposed in the wheel disk and extend to a fairly rigid elastomer or polymer mounting member 32, which is referred to as a dome. The dome 32 is secured to the selected sidewall 34 of the tire 12, and provides a secure mounting location in the tire sidewall for a first connection assembly 40, which fluidly connects the first connecting tube 22 to the first end 24 of the air tube 20, and a second connection assembly 42, which fluidly connects the second connecting tube 28 to the second end 30 of the air tube.

As described above, the sequential flattening of the air tube 20 and its passageway 64, segment by segment, directs air to the valve housing 26. This flattening of the air tube 20 and its passageway 64 is a peristaltic pumping action. In the prior art, the groove 38 that receives the air tube 20 has been formed with a symmetrical cross section, which is generally elliptical, and with an inwardly tapered portion at the open end of the groove to minimize the area to be protected by a cover strip. It has been discovered that the cross-sectional configuration or profile of the groove 38 may have a significant effect on the efficiency of the peristaltic pumping action of the air tube 20.

Figure 6:
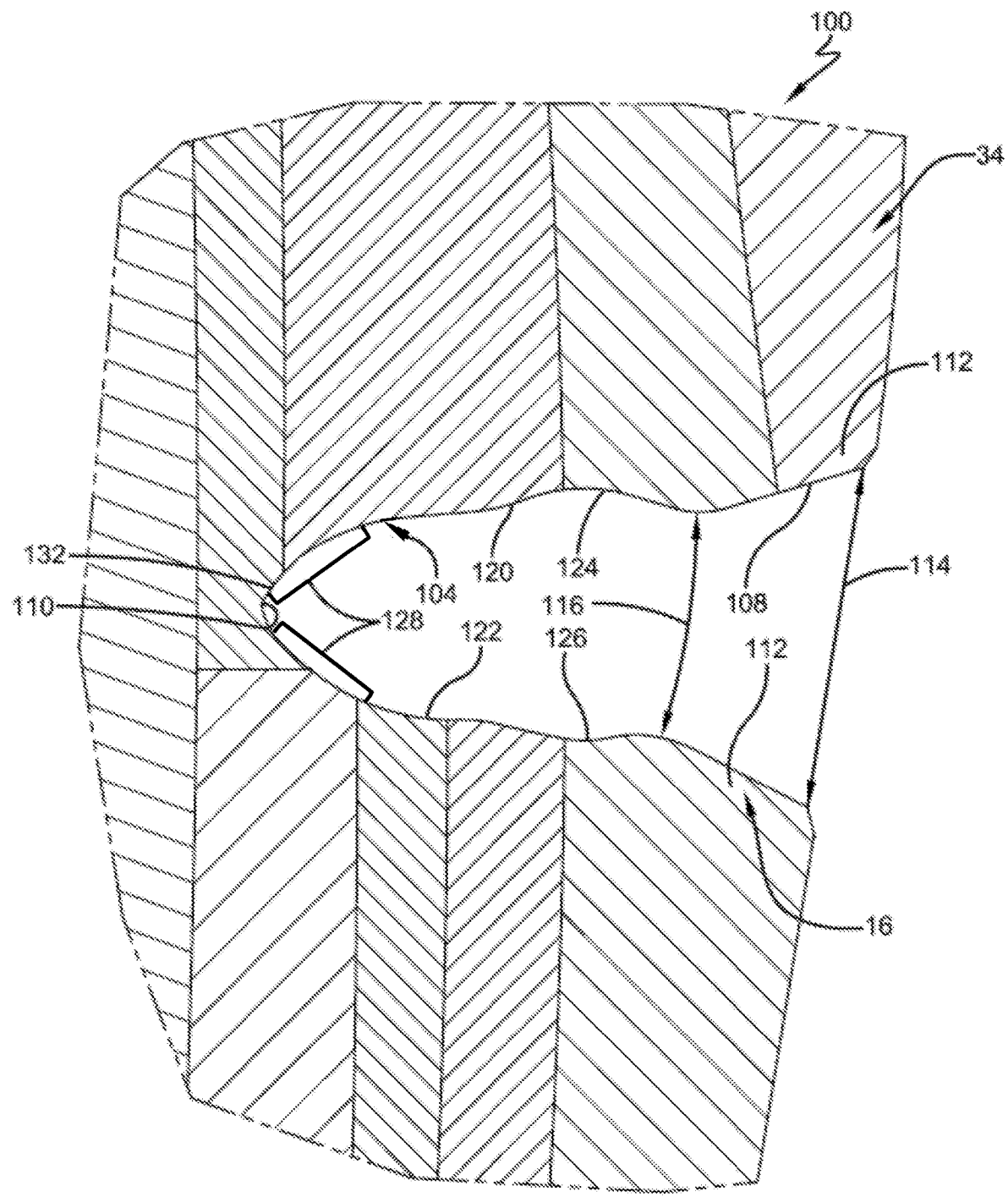
FIG. 6 is an enlarged cross-sectional view of a first exemplary embodiment of an air maintenance tire of the present invention and a groove formed therein.
Figure 7:
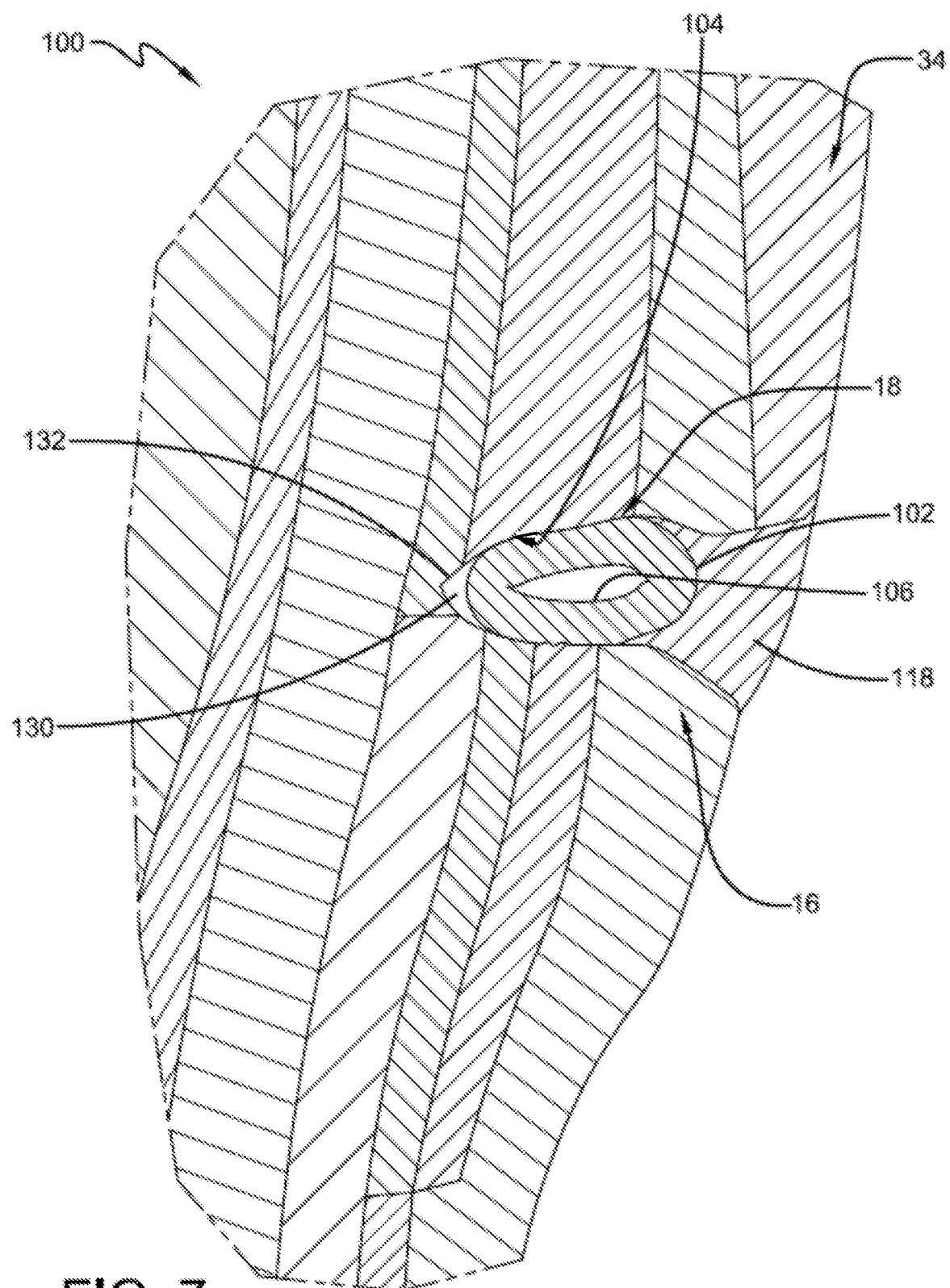
FIG. 7 is a cross-sectional view of the air maintenance tire shown in FIG. 6, including an air tube disposed in the groove.

More particularly, a first exemplary embodiment of an air maintenance tire of the present invention is indicated at 100 and is shown in FIGS. 6 and 7. For the purpose of convenience, components of the air maintenance tire 100 of the present invention that are generally similar to the prior art tire 12, including components of the exemplary AMT system 16, shall be referred to by the same component numbers used above.

The tire 100 is mounted on a rim 14 (FIG. 1) in a conventional manner. The tire is of a generally conventional construction, including a pair of sidewalls 34, 35 extending from respective bead areas 56, 58 to a crown or tire tread region 60 (FIG. 2). The AMT system 16 includes a peristaltic pump assembly 18, which in turn includes an annular air tube 102 that is received in an annular groove 104 formed in a selected one of the tire sidewalls 34. The air tube 102 encloses an annular passageway 106.

Figure 3:
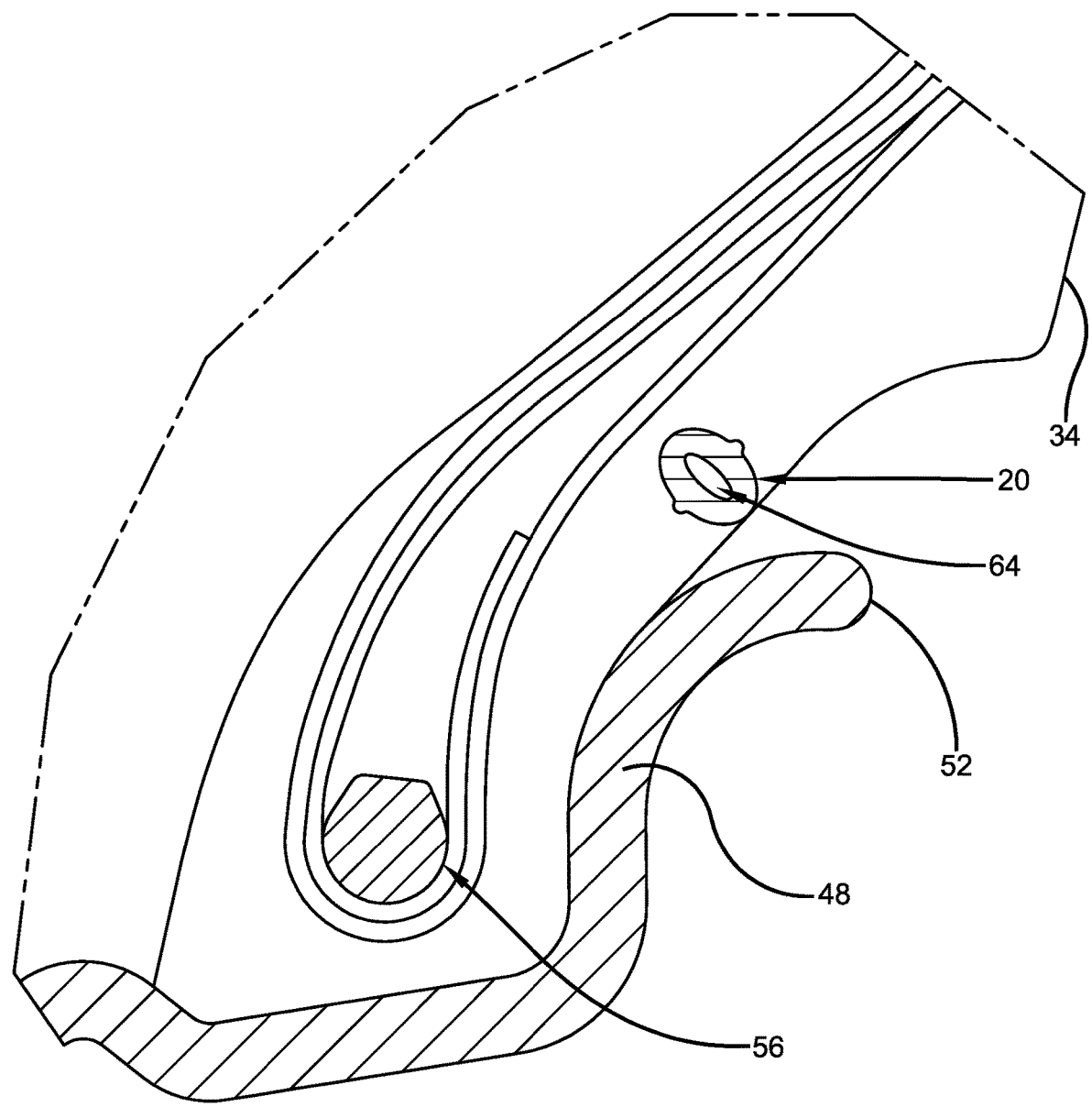
FIG. 3 is an enlarged view of the area from FIG. 2 designated as See FIG. 3.

The groove 104 is formed with an open end 108 and a closed end 110 that is opposite the open end. The open end 108 is at the outer surface of the tire sidewall 34, which enables the air tube 102 to be inserted into the groove. To provide easier insertion of the air tube 102 into the groove 104, the open end 108 is formed with an outward radial taper 112. The taper 112 includes a diameter 114 at the surface of the tire sidewall 34 that preferably is larger than the remaining maximum internal diameter of the groove 104, and which necks down to a smaller diameter 116 to form a conical profile shape. Such a profile shape enables more convenient access to the groove 104 for easy insertion of the air tube 102 into the groove when compared to a prior-art inwardly tapered groove 38 (FIG. 3). As shown in FIG. 7, after the air tube 102 is inserted into the groove 104, a cover strip 118 is attached to the tire sidewall 34 adjacent the air tube by an interference fit, adhesive bonding or other bonding, or a combination thereof, to protect the air tube.

The groove 104 is also formed with increased diameter features, rather than a smooth elliptical cross section. More particularly, the groove 104 includes a crown side 120 and a bead side 122. Between the closed end 110 and the smaller diameter 116 of the taper 112, the crown side 120 is formed with a convex feature 124 that preferably is based on a circle having about a 2.4 millimeter (mm) diameter. Between the closed end 110 and the smaller diameter 116 of the taper 112, the bead side 122 preferably is formed with a convex feature 126 that is based on a circle having about a 2.8 mm diameter.

In addition, the groove 104 is formed with a radially inward taper 128 at the closed end 110. Rather than being formed with a smooth elliptical profile, the radially inward taper 128 creates a significantly reduced-diameter area at the groove closed end 110, which forms a gap 130 between the groove wall 132 and the air tube 102 when the air tube is inserted into the groove 104.

The groove 104 may also be formed with an asymmetric profile. More particularly, the convex feature 124 on the crown side 120 of the groove 104 may be of a different size than the convex feature 126 on the bead side 122 of the groove. For example, the convex feature 124 on the crown side 120 of the groove 104 may be based on a circle having about a 2.4 mm diameter, while the convex feature 126 on the bead side 122 of the groove may be based on a circle having about a 2.8 mm diameter. Moreover, the crown side feature 124 may not radially align with the bead side feature 126 across the groove 104, creating further asymmetry.

The use of features such as the crown side feature 124 and the bead side feature 126 in groove 104 has been found to exhibit improved pneumatic pumping capability over the prior art elliptical-profile groove 38. Such pumping capability is further increased by the radially inward taper 128 at the closed end 110 of the groove 104, as well as the asymmetric profile of the groove. An analysis of the tire 100 formed with the groove 104 has shown that such improved pumping capability is attributable to higher kinematic motion of the air tube 102 in the groove, while the groove maintains the contact pressure between the tire sidewall 34 and the air tube.

Figure 8:
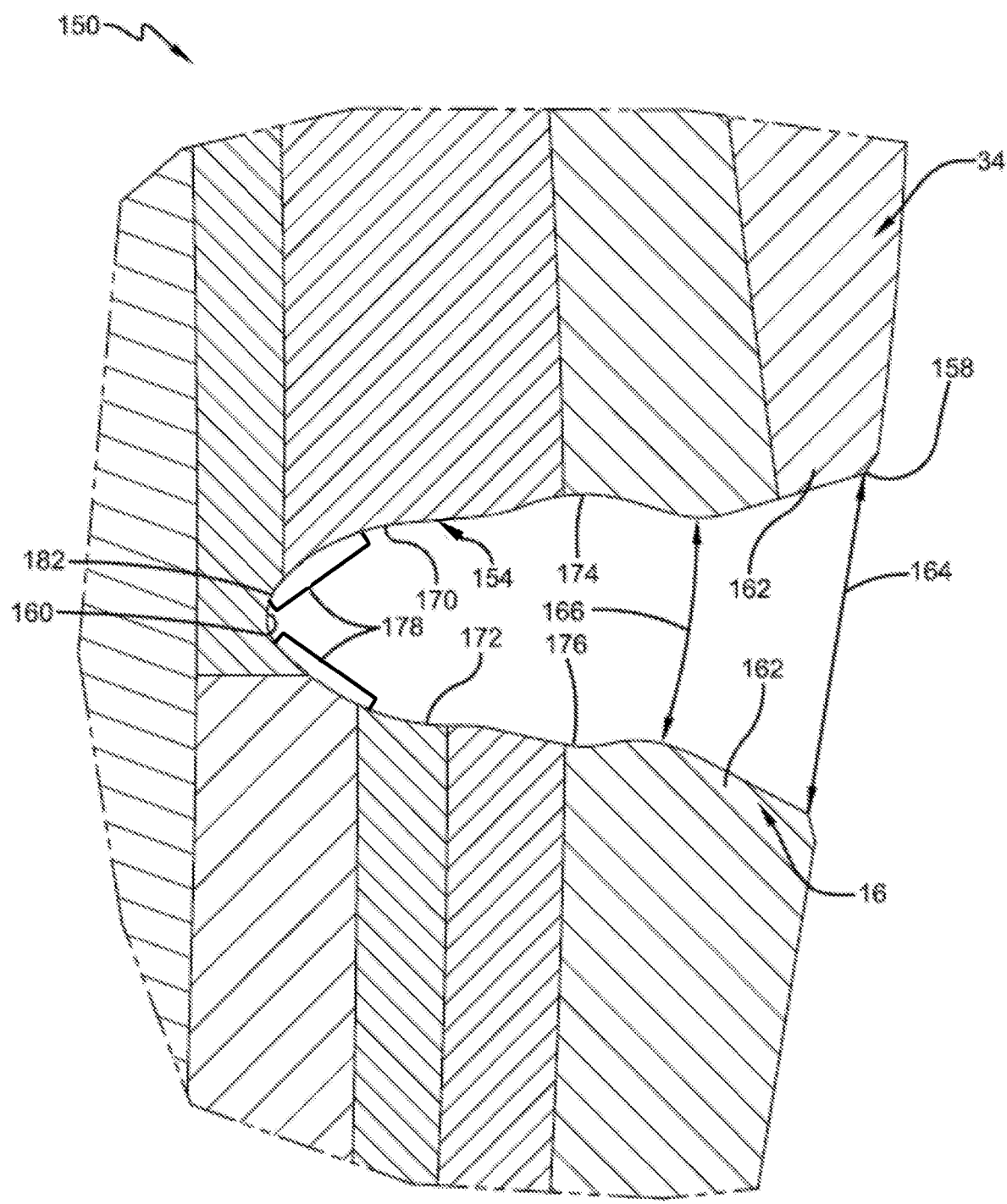
FIG. 8 is an enlarged cross-sectional view of a second exemplary embodiment of an air maintenance tire of the present invention and a groove formed therein.
Figure 9:
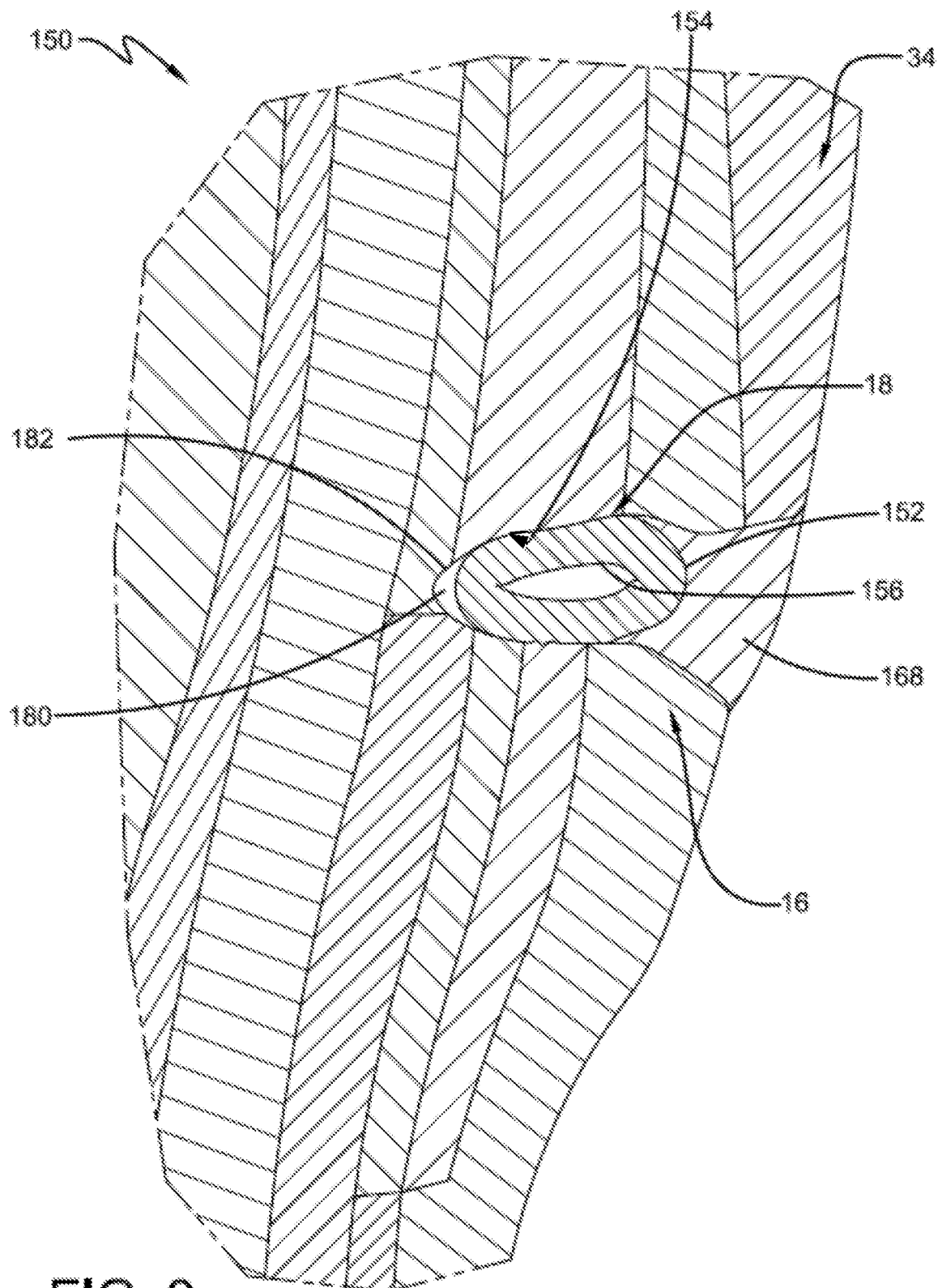
FIG. 9 is a cross-sectional view of the air maintenance tire shown in FIG. 8, including an air tube disposed in the groove.

A second exemplary embodiment of an air maintenance tire of the present invention is indicated at 150 and is shown in FIGS. 8 and 9. For the purpose of convenience, components of the air maintenance tire 150 of the present invention that are generally similar to the prior art tire 12, including components of the exemplary AMT system 16, shall be referred to by the same component numbers used above.

The tire 150 is mounted on a rim 14 (FIG. 1) in a conventional manner. The tire is of a generally conventional construction, including a pair of sidewalls 34, 35 extending from respective bead areas 56, 58 to a crown or tire tread region 60 (FIG. 2). The AMT system 16 includes a peristaltic pump assembly 18, which in turn includes an annular air tube 152 that is received in an annular groove 154 formed in a selected one of the tire sidewalls 34. The air tube 152 encloses an annular passageway 156.

The groove 154 is formed with an open end 158 and a closed end 160 that is opposite the open end. The open end 158 is at an outer surface of the tire sidewall 34, which enables the air tube 152 to be inserted into the groove. To provide easier insertion of the air tube 152 into the groove 154, the open end 158 is formed with an outward radial taper 162. The taper 162 includes a diameter 164 at the surface of the tire sidewall 34 that preferably is larger than the remaining maximum internal diameter of the groove 154, and which necks down to a smaller diameter 166 to form a conical profile shape. Such a profile shape enables more convenient access to the groove 154 for easy insertion of the air tube 152 into the groove when compared to a prior-art inwardly tapered groove 38 (FIG. 3). As shown in FIG. 9, after the air tube 152 is inserted into the groove 154, a cover strip 168 is attached to the tire sidewall 34 adjacent the air tube by an interference fit, adhesive bonding or other bonding, or a combination thereof, to protect the air tube.

The groove 154 is also formed with increased diameter features, rather than a smooth elliptical cross section. More particularly, the groove 154 includes a crown side 170 and a bead side 172. Between the closed end 160 and the smaller diameter 166 of the taper 162, the crown side 170 is formed with a convex feature 174 that preferably is based on a circle having about a 2.6 millimeter (mm) diameter. Between the closed end 160 and the smaller diameter 166 of the taper 162, the bead side 172 is formed with a convex feature 176 that preferably is also based on a circle having about a 2.6 mm diameter.

In addition, the groove 154 is formed with a radially inward taper 178 at the closed end 160. Rather than being formed with a smooth elliptical profile, the radially inward taper 178 creates a significantly reduced-diameter area at the groove closed end 160, which forms a gap 180 between the groove wall 182 and the air tube 152 when the air tube is inserted into the groove 104.

The use of features such as the crown side feature 174 and the bead side feature 176 in groove 154 has been found to exhibit improved pneumatic pumping capability over the prior art elliptical-profile groove 38. Such pumping capability is further increased by the radially inward taper 178 at the closed end 160 of the groove 154. An analysis of the tire 150 formed with the groove 154 has shown that such improved pumping capability is attributable to higher kinematic motion of the air tube 152 in the groove, while the groove maintains the contact pressure between the tire sidewall 34 and the air tube.

The present invention also includes a method of forming and a method of using an air maintenance tire. Each method includes steps in accordance with the description that is presented above and shown in FIGS. 6 through 9.

It is to be understood that the structure of the above-described air maintenance tire 100, 150 may be altered or rearranged, or components known to those skilled in the art omitted or added, without affecting the overall concept or operation of the invention.

The invention has been described with reference to preferred embodiments. Potential modifications and alterations will occur to others upon a reading and understanding of this description. It is to be understood that all such modifications and alterations are included in the scope of the invention as set forth in the appended claims, or the equivalents thereof.

What is claimed is:

1. An air maintenance tire, the tire including a pair of sidewalls, wherein each one of the sidewalls extends from a respective bead area to a crown of the tire, the air maintenance tire comprising:
    an annular groove formed in a selected one of the tire sidewalls, the groove being formed with an open end at an outer surface of the tire sidewall and a closed end opposite the open end, wherein the open end is formed with an outward radial taper;
    the annular groove being formed with an asymmetric profile;
    the annular groove including a crown side and a bead side, each one of the crown side and the bead side being formed with a respective convex feature between the closed end and the open end; and
    an air tube of a peristaltic pump assembly being received in the groove.

2. The air maintenance tire of claim 1, wherein the taper includes a diameter at the outer surface of the tire sidewall that is larger than a remaining maximum internal diameter of the groove.

3. The air maintenance tire of claim 1, wherein the convex feature formed on the crown of the annular groove includes a 2.4 millimeter diameter.

4. The air maintenance tire of claim 1, wherein the convex feature formed on the bead side of the annular groove includes a 2.8 millimeter diameter.

5. The air maintenance tire of claim 1, wherein the respective convex features are symmetrical to one another.

6. The air maintenance tire of claim 5, wherein each convex feature includes a 2.6 millimeter diameter.

7. The air maintenance tire of claim 1, wherein the closed end of the groove is formed with a radially inward taper, the radially inward taper forming a gap between a wall of the groove and the air tube when the air tube is inserted into the groove.

8. The air maintenance tire of claim 1, further comprising a cover strip being attached to the tire sidewall adjacent the air tube.

9. An air maintenance tire, the tire including a pair of sidewalls, wherein each one of the sidewalls extends from a respective bead area to a crown of the tire, the air maintenance tire comprising:

an annular groove formed in a selected one of the tire sidewalls, the groove being formed with an open end at an outer surface of the tire sidewall and a closed end opposite the open end, wherein the groove is formed with at least one increased diameter feature;

the annular groove being formed with an asymmetric profile;

the annular groove including a crown side and a bead side, each one of the crown side and the bead side being formed with a respective convex feature between the closed end and the open end; and an air tube of a peristaltic pump assembly being received in the groove.

10. The air maintenance tire of claim 9, wherein the convex features are symmetrical relative to one another.

11. The air maintenance tire of claim 9, wherein the open end of the groove is formed with an outward radial taper.

12. The air maintenance tire of claim 9, wherein the closed end of the groove is formed with a radially inward taper, the radially inward taper forming a gap between a wall of the groove and the air tube when the air tube is inserted into the groove.

* * * * *